William H. Swain
INVENTOR.

April 21, 1964 W. H. SWAIN 3,130,323
SIGNAL TRANSLATING SYSTEMS
Filed Dec. 29, 1958 2 Sheets-Sheet 2

William H. Swain
INVENTOR.

BY *William R. Sherman*

ATTORNEY

United States Patent Office 3,130,323
Patented Apr. 21, 1964

3,130,323
SIGNAL TRANSLATING SYSTEMS
William H. Swain, Sarasota, Fla., assignor to Electro-Mechanical Research, Inc., Sarasota, Fla., a corporation of Connecticut
Filed Dec. 29, 1958, Ser. No. 783,319
16 Claims. (Cl. 307—88.5)

The present invention relates to systems for translating electrical signals and, more particularly, to systems for producing output signals which vary in accordance with a definite mathematical function of input signals.

Semiconductor diodes have been utilized heretofore as computer elements, advantage being taken of their asymmetrical conduction of current for the representation of non-linear functions. In some instances, such diodes have been used to develop a signal which varies as the logarithm of an applied signal. Because of the small size, reliability, and relatively low cost of semiconductor diodes, it would be desirable to extend their utility as computing elements. Their characteristics under usual operating conditions are, however, so far from linear that simple operations such as multiplication and division of applied signals have not been realized with a satisfactory degree of accuracy. In addition, the operation is variable with temperature and thus subject to drift.

It is accordingly an object of the invention to provide new and improved signal translating systems in which semiconductor diodes serve as accurate computing elements.

Another object of the invention is to provide new and improved translating systems wherein semiconductor circuit elements are utilized to provide a linear variation of one signal in response to another signal over a wide range, where the frequencies of the signals are different.

Still another object of the invention is to produce new and improved signal translating systems wherein semiconductor circuit elements are employed affording an accurate computation of products or quotients.

Yet another object of the invention is to provide new and improved signal translating systems of rugged, reliable and compact character for performing mathematical operations upon applied signals.

These and other objects are attained in accordance with the invention, by employing one or more semiconductor circuit elements having a forward operating range wherein the incremental conductivity of the element varies in direct proportion to the current which is passed through it. Means are provided for passing through the semiconductor element a biasing current which maintains forward conduction in the operating range. In response to first and second potentials, first and second currents are passed through the semiconductor element, at least one of which is alternating and substantially smaller than the other. A potential resulting from the flow of the smaller current is sensed to provide a measure of prescribed function of the first and second potentials.

In one embodiment, the potential across a semiconductor element at the frequency of the smaller current is sensed to provide a measure of the quotient of the first and second potentials. In another embodiment, a potential is sensed which is directly proportional to the product of the first and second potentials. In other embodiments of the invention, a pair of semiconductor circuit elements is arranged in balanced relation to compensate for temperature variations while deriving a measure of the product of the applied signals.

The invention will be better understood from the following detailed description taken in conjunction with the drawings, in which.

Figure 1:
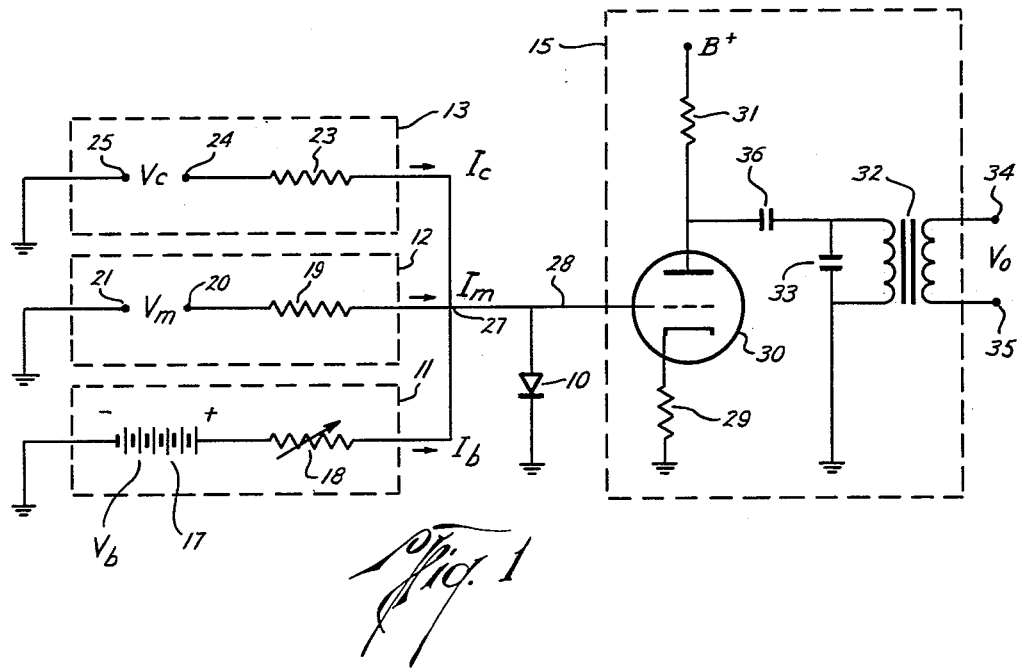
FIG. 1 is a schematic diagram of a signal translating system in accordance with the invention.

In FIG. 1 is shown a semiconductor circuit element or diode 10 arranged in shunt between current sources 11, 12 and 13 and a voltage amplifier 15. Current source 11 is arranged to pass a D.C. biasing current $I_b$ in the forward or more conductive direction through diode 10 and through a ground return path. Suitably, the current source 11 may include a battery 17 having its negative terminal grounded and a series, current regulating resistor 18 of relatively high value. To pass the biasing current from source 11 in the forward direction, the diode 10 is connected for easy conduction toward the ground return point.

The current source 12 is connected in parallel with the source 11 and may comprise a high-valued current limiting resistor 19 in series with terminals 20, 21 to which a first signal potential $V_m$ may be applied. The current $I_m$ supplied by the source 12 may be alternating or direct and may have a frequency extending from zero to 100 kilocycles or more, the magnitude of the current being dependent upon the potential $V_m$ and substantially independent of changes in the impedance of diode 10.

In a similar manner, the current source 13 is connected in parallel with source 11 and may suitably comprise the high-valued current limiting resistor 23 in series with terminals 24 and 25 to which a second signal potential $V_c$ may be applied. The signal $V_c$ is alternating and suitably has a frequency in the audio frequency range or higher. In relation to the current $I_m$ supplied from the source 12 in response to the first potential $V_m$, the current $I_c$ supplied from the source 13 in response to the second potential $V_c$ is substantially smaller, for example, at least five times smaller and desirably smaller by an order of magnitude or more. Furthermore, diode 10 has a substantially lower impedance than resistors 18, 19, and 23 at all times in the operating cycle.

The currents from the three sources 11, 12 and 13 are summed or superimposed at a junction point 27 and passed by conductor 28 to the ungrounded terminal of the semiconductor diode 10. Conductor 28 also connects the junction point 27 with the input of the linear voltage amplifier 15, which has an input impedance much greater than diode 10 at all times in the operating cycle. To provide a high input impedance, conductor 28 may connect directly with the control electrode of a vacuum tube amplifying device 30 forming a stage of amplifier 15. Amplifying device 30 may conveniently be of the triode type having its anode-cathode path connected by anode resistor 31 to the positive terminal B+ of a suitable anode current supply, its cathode being connected to ground through bias resistor 29. To render the amplifier selectively responsive to the component of potential across the diode 10 which is at the frequency of the second signal $V_c$, a tuned coupling circuit is connected between the anode of triode 30 and ground through D.C. blocking capacitor 36, and is resonant at the frequency of the second signal $V_c$. The tuned output circuit may comprise, for example, a transformer 32 having its primary winding connected in the anode circuit and a capacitor 33 connected across the primary winding. Across terminals 34, 35 of the secondary winding may be derived an output potential $V_o$.

In accordance with the invention, the semiconductor diode 10 is preferably a silicon junction diode but may, for example, be a germanium junction diode or a germanium point contact diode, the diode more particularly being characterized by a high degree of conformance over a very wide operating range to the characteristic voltage-current relationship:

$$(1) \qquad I = I_s \left( e^{\frac{FqV}{kT}} - 1 \right)$$

where I is the instantaneous current through the diode in amperes, $I_s$ is the theoretical reverse saturation current through the diode in amperes, $k$ is Boltzmann's constant ($1.38 \cdot 10^{-23}$ volt coulombs/° K.), T is the absolute temperature in degrees Kelvin, $q$ is the charge on an electron ($1.602 \cdot 10^{-19}$ coulombs), V is the voltage in volts across the diode, and F is a figure of merit for the diode. The figure of merit F is defined in terms of physical constants and measured diode parameters, as follows:

$$(2) \qquad F = \left(\frac{kT}{q}\right)\left(\frac{G}{i}\right) = \frac{\text{thermal energy}}{\text{observed energy}}$$

where $k$, T and $q$ are basic constants defined above and $$G = \frac{di}{dv}$$

the incremental conductivity observed at current ($i$) amperes using carrier or other techniques suited to determining the slope of the Amps./Volt transfer curve of the diode at current ($i$). For satisfactory operation in accordance with the invention, the figure of merit F should be constant within the desired operating range of current and temperature, and should have a value approaching unity. Silicon junction diodes of good quality are currently produced having a figure of merit on the order of 0.8 or better. Germanium junction diodes having a figure of merit 0.6 and germanium point contact diodes having a figure of merit of 0.6 have also been employed. It may be observed that the quality of semiconductor diodes for purposes of this invention may be measured by the approach of the figure of merit to its limiting value of unity, although the limiting value may be expressed as other than unity where the relationship (1) is differently stated or other units are employed for the various parameters. Significant to the operation of the diode 10 as a computer element is its incremental conductivity G which may be defined as the derivative of the current through the diode with respect to the voltage across it. By differentiating the expression (1) with respect to the voltage V, the incremental conductivity G is found to be given as:

$$(3) \qquad \frac{di}{dv} = G = \frac{FC}{T}(I + I_s)$$

or $$(4) \qquad G = \frac{FC}{T} \cdot I, \text{ amperes/volt, or mhos}$$

where I is much greater than $I_s$, or $I_s$ is negligibly small, and the constant C is equal to the ratio $q/k$ or approximately 11,600 ° K./volt.

With presently available silicon junction diodes, reverse saturation currents as small as $10^{-10}$ to $10^{-20}$ ampere may be obtained, so that the saturation current $I_s$ may be neglected even though the instantaneous current I is as low as $10^{-8}$ ampere, for example. It will be observed that the incremental conductivity is a direct linear function of the total instantaneous current I and is inversely proportional to the absolute temperature T. The maximum instantaneous forward current I for operation of high quality semiconductor elements in accordance with the exponential relationship (1) may, for example, be $10^{-3}$ ampere. The maximum voltage across the silicon element which corresponds to a total forward current on the order of a milliampere, or a fraction thereof, is a fraction of a volt such as, for example, 0.6 volt. Germanium diodes generally operate with greater currents and lower voltages, than silicon diodes.

Figure 2:
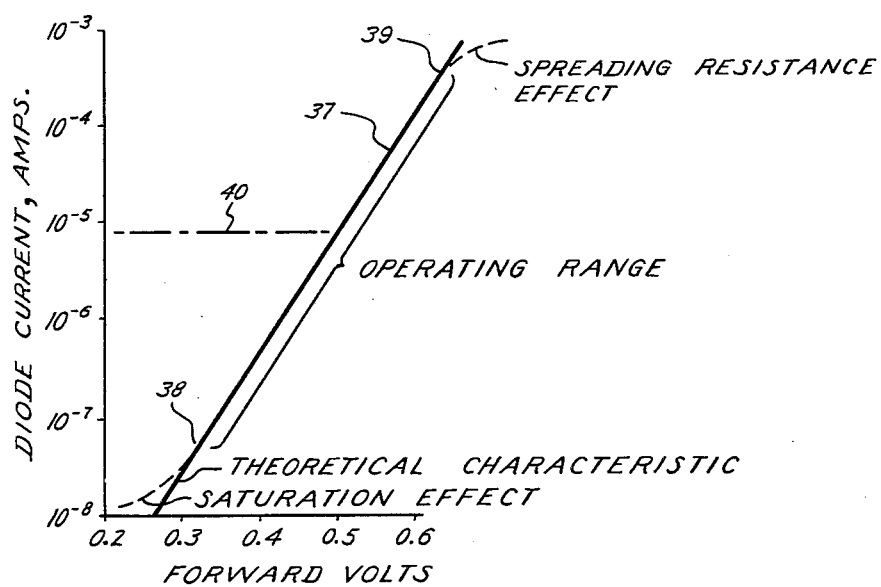
FIG. 2 is a graphical representation of typical characteristics of a semiconductor circuit element utilized in accordance with the invention.

A suitable operating range is represented graphically in FIG. 2 by the portion of the straight solid line 37 extending between points 38 and 39, beyond which the typical voltage-current characteristics represented by the dotted line 40 depart from the theoretically perfect exponential characteristics represented by the straight solid line 37. The scale of diode current values, it may be noted, is logarithmic, whereas the scale of forward volts is linear. A straight line relationship also exists between forward current I and incremental conductivity G where linear scales are used for both values. Currents measured at constant voltage are approximately an exponential function of temperature, since $I_s$ varies in approximately this manner.

In a typical operation of the system of FIG. 1, the biasing current source 11 is adjusted to pass a biasing current through resistor 18 of value $I_b$ and also through the diode 10 within the forward operating range of the diode, as is represented in FIG. 2. For example, the biasing current may be adjusted to have a value of $10^{-5}$ ampere as represented by the dotted line 40 in FIG. 2, whereby the diode is biased for operation at a central value within the operating range. With the characteristics represented in FIG. 2, the operating range then extends two decades both above and below the bias value, in terms of the range of diode current. The diode 10 thus has a reference value of incremental conductivity G corresponding to the biasing current. Inflection points of FIG. 2 will be a function of temperature.

Superimposed upon the biasing current $I_b$ is the current $I_m$ from the source 12 which corresponds to the applied potential $V_m$ and has a value which, when added to the biasing current, results in a total instantaneous current within the defined operating range. In passing through the semiconductor diode 10, this current serves to produce a corresponding variation in the incremental conductivity of the diode. If the current from source 12 is unidirectional or slowly varying, the incremental conductivity is determined in accordance with expression (4) by the sum of this current and the biasing current. In many instances, however, the current supplied by source 12 is alternating and produces an alternating component of incremental conductivity which varies in direct linear correspondence.

The source 13 is energized by the potential $V_c$ to pass alternating current $I_c$ through the diode having a frequency which is preferably greater than the frequency of the source 12. However, the amplitude of current supplied by source 13 is much smaller than the amplitude of current supplied by source 12 so as to have a negligible effect upon the incremental conductivity of the semiconductor diode 10. Typically, the low-valued current from source 13 will pass through diode 10 with at least one alternation during an interval when the incremental conductivity undergoes no more than a slight variation with the changing values of the potential $V_m$.

At any instant, therefore, the potential across the diode at the frequency of the second potential $V_c$ is directly proportional to the ratio $I_c/G$, or $V_c/V_m+V_b$, recognizing that the current $I_c$ is directly proportional to the applied potential $V_c$ and that the conductivity $G$ is directly proportional to the current $I_m+I_b$ and hence, to the applied voltage $V_m+V_b$. That is to say, the voltage applied to the control grid of the amplifier is proportional to the quotient of the applied signals $V_c$ and $V_m$ plus a bias term. Amplifier 15 serves to selectively reproduce the signal $V_o$ having a value proportional to this quotient, at the same time isolating the diode circuit from the load circuit. If desired, the input potential $V_c$ may be maintained constant, so that the output potential $V_o$ corresponds with the reciprocal of the applied potential $V_m$ plus the bias term.

Figure 3:
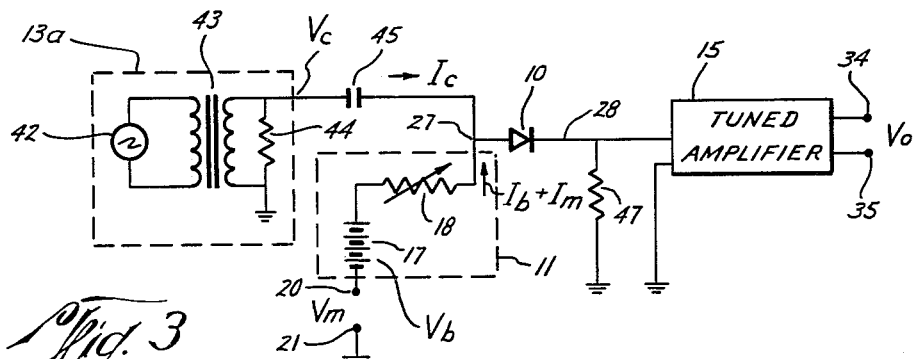
FIG. 3 is a schematic diagram of a signal translating system in accordance with another embodiment of the invention.

In the embodiment of the invention illustrated in FIG. 3, a low impedance source 13a serves to apply the signal $V_c$ to a modified circuit including the diode 10 with a result that an output potential $V_o$ is derived from the tuned amplifier 15 which varies as the product of the input potentials $V_c$ and $V_m$. At the same time, the potential $V_m$ is applied in series with the biasing potential provided by battery 17.

More particularly, the terminals 20, 21 at which the potential $V_m$ is applied are conveniently connected in series with the current source 11, terminal 21 again being grounded. The high-valued resistor 18 in this instance serves to limit and regulate not only the biasing current but also to limit and determine the current flowing as a result of the applied potential $V_m$. The source 13a comprises an alternating supply 42 coupled by transformer 43 across a low-value resistor 44, one terminal of which is grounded. The other terminal of resistor 44 is coupled by blocking capacitor 45 to the junction 27. Junction 27 is again connected by conductor 28 to the terminal of diode 10 which is away from ground. However, the other terminal of diode 10 is connected to ground through a low-valued resistor 47 across which is developed the potential applied to the input of the tuned amplifier 15. Diode 10 is thus connected in series between the sources and the amplifier.

In a typical operation of the embodiment of FIG. 3, the biasing and first signal currents $I_b$ and $I_m$, respectively, are combined at junction 27 with the second signal current $I_c$ from source 13a, so that all the currents flow together through the semiconductor circuit element 10 and the low-valued resistor 47 in series with it. While the biasing current $I_b$ maintains conduction through the diode 10 in the desired forward operating range, the signal current $I_m$ determines the variations of incremental conductivity of the diode.

The signal current $I_c$, which preferably has a higher frequency but lower magnitude relative to the signal current $I_m$, passes through the diode 10 and resistor 47 to develop across resistor 47 a voltage of corresponding frequency and magnitude. Because the conductivity of the resistor 47 is much greater than the incremental conductivity of the diode 10, the flow of current $I_c$ from the low impedance source 13a is primarily dependent upon the incremental conductivity of the diode 10; that is, the current $I_c$ is substantially equal to the product of the potential $V_c$ and the incremental conductivity $G$ of the diode 10. Since the incremental conductivity $G$ is, in turn, proportional to the signal current $I_m$ and likewise proportional to the potential $V_m+V_b$, it follows that the current $I_c$ is proportional to the product of the applied potentials $V_c$ and $V_m+V_b$. The output potential $V_o$, therefore, represents a product of the applied input potentials.

Figure 4:
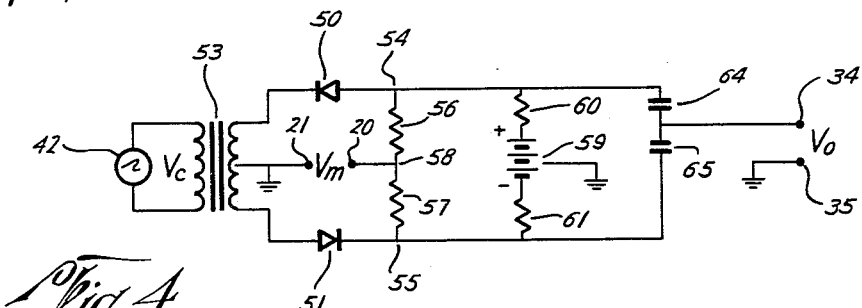
FIG. 4 is a schematic diagram of a signal translating system in accordance with still another embodiment of the invention.

While each of the circuits of FIGS. 1 and 3 introduces a bias term in the quotient of product and requires a regulated temperature environment to avoid drift with temperature, or a suitable arrangement for eliminating the constant bias term and compensating such drift, there may be employed, in accordance with the invention, a pair of semiconductor circuit elements connected in balanced relationship to achieve a circuit producing a true product and substantially insensitive to temperature over a wide range. Thus, in FIG. 4 is shown a pair of diodes 50, 51, connected in a bridge circuit in balanced, but oppositely poled relation with respect to ground. Each of diodes 50 and 51 may be similar to diode 10 described above and thus have a forward operating range wherein their incremental conductivity varies linearly with the current therethrough.

In the embodiment of FIG. 4, the low-voltage, low-impedance alternating supply 42 is connected across the primary winding of a transformer 53 having a midtapped secondary winding, the midtap being grounded and the terminals of the secondary winding being connected to terminals of the diodes 50 and 51 having opposite polarities. The remaining terminals of diodes 50 and 51 are connected to junction points 54 and 55, respectively, defining one diagonal of the bridge circuit. Equal current limiting resistors 56, 57 are connected between the junction points 54 and 55 to define legs of the bridge circuit. At their junction point 58 is applied the signal $V_m$ with respect to the grounded midtap of this secondary winding for transformer 53. Connected on the diagonal between junction points 54 and 55 is a source of D.C. biasing current which may comprise a battery 59 and equal current limiting resistors 60, 61, whereby the battery 59 is poled to pass current in the forward direction through diodes 50 and 51. Equal blocking capacitors 64, 65 are also connected in series between the junction points 54 and 55 and have their common junction connected to the ungrounded output terminal 34 for deriving a differential output signal. The load on $V_o$ preferably should have a high impedance, e.g., a vacuum tube grid.

In an exemplary operation of the system of FIG. 4, the diodes 50 and 51 are maintained conductive in the desired forward operating region by passage of D.C. current from the battery 59. The signal potential $V_m$ applied between the junction point 58 and ground causes the flow of a proportional current through each of the diodes 50, 51. However, because the diodes are oppositely poled, the potential $V_m$ will increase at any instant the forward current through one of the diodes and decrease the forward current through the other diode, thereby to produce opposite changes in the incremental conductivities of the diodes relative to the common value of incremental conductivity resulting from the flow of the biasing current. Thus, the circuit is unbalanced in an amount dependent upon the magnitude of applied potential $V_m$ and in a sense or phase dependent upon the sense or phase of the potential $V_m$. Since the output potential $V_o$ arises as a result of unbalance of the circuit, a linear correspondence between the output potential $V_o$ and the input potential $V_m$ is thus ensured. $V$ is a true product of $V_c$ and $V_m$: i.e., $V_o = aV_mV_c$, when "$a$" is a constant. It is interesting to note that $V_c$ and $V_m$ may now be at any desired frequency; i.e., $V_m$ may be at a frequency below, equal to, or above $V_c$. The logarithmic nature of the diodes permits capacitances 64 and 65 to have any large value which by-passes the frequency of $V_c$. Capacitances 64 and 65 do not materially alter the high-frequency gain of $V_m$.

At the same time, a change in temperature produces a like change in the incremental conductivities of each of diodes 50 and 51, without unbalancing the circuit. As the voltage change across the diodes at the frequency of the signal $V_c$ varies with the temperature only in a balanced way with respect to the output terminals 34 and 35, the circuit may be used in a wide variety of environments experiencing a great range of temperature variation without susceptibility to drift or error arising from changing temperatures.

Figure 5:
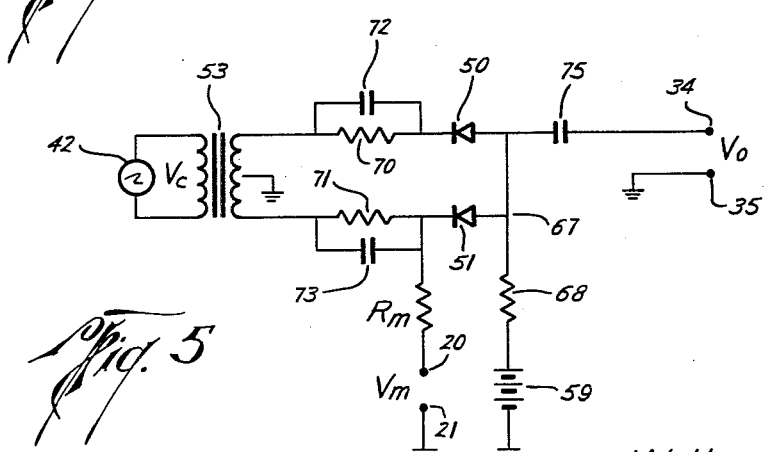
FIG. 5 is a schematic diagram of a signal translating system in accordance with yet another embodiment of the invention.

The diodes 51 and 52 may also be arranged, as shown in FIG. 5, in a manner which permits use of a single-ended source of biasing current, that is, a source having one terminal grounded. In this embodiment of the invention, the diodes 50 and 51 are connected in similarly poled relation in parallel branches of the circuit and have a junction 67 connected by current limiting resistor 68 with the source 59 of biasing current. Conveniently, the resistor 68 is connected to the positive terminal of source 59, while its negative terminal is grounded. In series with diodes 50 and 51, respectively, are equal current dividing resistors 70, 71 shunted by respective by-pass capacitors 72, 73. The condensers 72, 73 serve to connect the diodes 50, 51 to the respective terminals of the secondary winding of transformer 53, the midtap of the secondary winding being ground to provide a return current path. A blocking capacitor 75 may be connected between the output terminal 34 and the junction point 67 of the diodes 50, 51.

In an exemplary operation of the apparatus of FIG. 5, D.C. biasing current is delivered from the source 59 to the respective diodes. When no signal potential $V_m$ is applied, resistors 70, 71 promote an equal distribution of current in the parallel branches of the circuit, the magnitude of the total current being substantially regulated by the high-valued resistor 68, which is much greater than resistors 70, 71. Hence, each of the diodes is made operative in the desired range and each has the same reference value of incremental conductivity. However, when a signal potential $V_m$ is applied having, say, a positive value with respect to ground, the current flow through the branch of the circuit to which the potential is applied is reduced. Since the total current flowing from the biasing current source 59 remains substantially constant, a reduction in the current in one branch of the circuit entails a corresponding increase in the other branch. If the signal potential $V_m$ is negative in polarity, flow of biasing current through the diode 51 is increased and the flow of biasing current through the other diode 50 is thereby decreased. It follows, then, that the incremental conductivities of diodes 50 and 51 are varied in opposite directions from a like normal value in response to changing values of the input signal $V_m$. Any unbalance in the branches of the circuit is again reflected in the output potential $V_o$.

The invention is, of course, susceptible to a range of other variations and modes of utilization. Accordingly, the invention is not to be limited to the embodiments illustrated and described but is of scope defined in the appended claims.

I claim:

1. In a signal translating system, the combination comprising at least one semiconductor circuit element having a forward operating range wherein its incremental conductivity varies linearly with current therethrough, means providing a path for direct current through said element to maintain forward conduction therethrough in said operating range, means for varying said direct current within said range to produce a corresponding first variation in the incremental conductivity of said element, means responsive to an alternating potential for producing a second variation in the current through said element which is substantially less than said first variation, and means coupled with said element and responsive to said second variation for deriving a potential which varies as a function of said alternating potential and said incremental conductivity.

2. In a signal translating system, the combination comprising at least one semiconductor circuit element having a forward operating range wherein its incremental conductivity varies linearly with current therethrough, means providing a path for direct current through said element to maintain forward conduction through said element in said operating range, means for producing a first variation of the current through said element within said range correspondingly to vary the incremental conductivity of said element, means responsive to an alternating potential for producing a second variation in the current through said element which is substantially smaller than said first variation, and means coupled with said element and responsive to the second variation of current therethrough for deriving a potential which varies as a linear function of said alternating potential and is a function of said incremental conductivity.

3. In a signal translating system, the combination comprising at least one semiconductor circuit element having a forward operating range wherein its incremental conductivity varies linearly with current therethrough, means providing a path for direct current through said element to maintain a forward conduction therethrough in said operating range, means responsive to a first varying potential for producing a first variation in the current through said element within said range correspondingly to vary the incremental conductivity of said element, means responsive to an alternating potential for producing a second variation in the current through said element which is substantially smaller than said first variation, and means coupled with said element for deriving a potential at the frequency of said alternating potential which varies directly as the product of said alternating potential and a power function of said incremental conductivity.

4. In a signal translating system, the combination as defined in claim 3 wherein said potential deriving means is responsive to the potential across said element for deriving a potential which varies as the quotient of said first and second potentials.

5. In a signal translating system, the combination as defined in claim 3 wherein said potential deriving means is responsive to the current flowing through said element for deriving a potential which varies as the product of said first and second potentials.

6. In a signal translating system, the combination comprising at least one semiconductor circuit element having a forward operating range wherein its incremental conductivity varies linearly with current therethrough, means for passing a substantially constant direct current through said element to maintain forward conduction therethrough in said operating range, means for superimposing on said direct current a variable current directly proportional to an applied potential for correspondingly varying the incremental conductivity of said element, means for coupling a source of alternating potential with said element to pass an alternating current through said element independent of the incremental conductivity of said element, and means coupled with said element and selectively responsive at the frequency of said alternating current for deriving a signal which is proportional to the quotient of said alternating potential and said applied potential.

7. In a signal translating system, the combination comprising at least one semiconductor circuit element having a forward operating range wherein its incremental conductivity varies linearly with current therethrough, means for passing a substantially constant direct current through said element to maintain forward conduction therethrough in said operating range, means for superimposing on said direct current a variable current directly proportional to an applied potential for correspondingly varying the incremental conductivity of said element, means for coupling a source of alternating potential with said element to pass an alternating current through said element dependent upon the incremental conductivity of said element, and means coupled with said element and selectively responsive at the frequency of said alternating current for deriving a signal which is proportional to the product of said alternating potential and said applied potential.

8. In a signal translating system, the combination comprising at least one semiconductor circuit element having a forward operating range wherein its incremental conductivity varies linearly with current therethrough, biasing means connected in series with said element for passing a substantially constant direct current through said element to maintain forward conduction therethrough in said operating range, means including a high impedance for connecting a source of variable potential in series with said element and in parallel with said biasing means for superimposing on said direct current a variable current for correspondingly varying the incremental conductivity of said element within said operating range, means including a high impedance for connecting a source of alternating potential in series with said element and in parallel with said biasing means to pass an alternating current through said element independent of the incremental conductivity of said element, and means selectively responsive to the potential across said element at the frequency of said alternating potential for deriving a signal which is proportional to the quotient of said alternating potential and said variable potential.

9. In a signal translating system, the combination comprising at least one semiconductor circuit element having a forward operating range wherein its incremental conductivity varies linearly with current therethrough, biasing means connected in series with said element for passing a substantially constant direct current through said element to maintain forward conduction in said operating range, means for superimposing on said direct current a variable current directly proportional to an applied potential for correspondingly varying the incremental conductivity of said element within said operating range, means for coupling a low impedance source of alternating potential in series with said element to pass an alternating current through said element depending upon its incremental conductivity, and means coupled with said element and responsive to said alternating current for deriving a signal which is proportional to the product of said alternating potential and said applied potential.

10. In a signal translating system, the combination comprising a pair of semiconductor circuit elements each having a forward operating range wherein its incremental conductivity varies linearly with current therethrough, means for passing a substantially constant direct current of equal value through each of said elements to maintain forward conduction therethrough in said operating range, means for superimposing on said direct current a variable current through each of said elements directly proportional to an applied potential for correspondingly varying the incremental conductivities of said elements in opposite senses, means for coupling a source of alternating potential with said elements to pass an alternating current of the same value through said elements dependent upon the incremental conductivity of said elements, and means coupled in differential relationship with said elements and responsive to the difference in said alternating currents for deriving a signal at the frequency of said alternating potential which is proportional to the product of said alternating potential and said applied potential.

11. In a signal translating system, the combination comprising a pair of semiconductor circuit elements each having a forward operating range wherein its incremental conductivity varies linearly with current therethrough, biasing means connected in series with said elements for passing a substantially constant direct current in the forward direction through said elements in said operating range, means for coupling a source of variable potential in parallel with said elements for passing variable currents each directly proportional to the variable potential through said elements in the opposite sense for varying the incremental conductivity of said elements within said operating range, means for coupling a source of alternating potential in series with said elements to pass an alternating current through said elements dependent upon their incremental conductivities, and means coupled in differential relationship with said elements and responsive to the difference in alternating current passed through said elements for deriving a signal at the frequency of said alternating potential which is proportional to the product of said alternating potential and said variable potential.

12. In a signal translating system, the combination comprising a pair of semiconductor circuit elements each having a forward operating range wherein its incremental conductivity varies linearly with the current therethrough, means for connecting said circuit elements in parallel branches of a circuit in series with a source of substantially constant direct current, equal resistance means in each of said parallel branches for promoting a balanced flow of said direct current through each of said elements within said operating range, said elements being similarly poled for forward conduction of said direct current, means for applying a variable potential to said elements in oppositely poled relation to produce equal and opposite changes in current therethrough, means for coupling a source of alternating potential in series with said elements to pass an alternating current therethrough dependent upon the incremental conductivities of said elements, and means coupled in differential relationship with said elements and responsive to the difference in alternating current passed through said elements for deriving a signal at the frequency of said alternating potential which is proportional to the product of said alternating potential and said applied potential.

13. In a signal translating system, the combination comprising at least one silicon junction diode having a forward operating range wherein its incremental conductivity varies linearly with current therethrough, biasing means for passing a substantially constant direct current through said element to maintain forward conduction in said operating range through said diode, means for superimposing on said direct current a variable current directly proportional to an applied potential for correspondingly varying the incremental conductivity of said diode within said operating range, means for coupling a source of alternating potential with said diode to pass an alternating current through said diode dependent upon its incremental conductivity and at least an order of magnitude smaller than said variable current, and means coupled with said diode and responsive to said alternating current for deriving a signal which is proportional to the product of said alternating potential and said applied potential.

14. A signal translating system, the combination as defined in claim 13 wherein said diode has a factor of merit approaching the maximum theoretical value, and a negligible reverse saturation current at operating temperatures.

15. In a signal translating system, the combination comprising at least one semiconductor circuit element having a forward operating range wherein its incremental conductivity varies linearly with current therethrough, biasing means connected in series with said element for passing a substantially constant direct current through said element to maintain forward conduction in said operating range, means for superimposing on said direct current a variable current directly proportional to an applied potential for correspondingly varying the incremental conductivity of said element within said operating range, means for coupling a low impedance source of alternating potential in series with said element to pass an alternating current through said element depending upon its incremental conductivity, and means coupled with said element for deriving a signal which is proportional to the product of said alternating potential and said applied potential, said signal deriving means including a fixed resistor in series with said element for developing a potential difference proportional to the alternating current flowing through it, and amplifying means selectively responsive to the component of the potential developed across said fixed resistor at the frequency of said alternating potential.

16. In a signal translating system, the combination comprising a plurality of semiconductor diodes, biasing means connected in series with each of said diodes for passing substantially constant direct current through said diodes in a direction and with a magnitude to maintain forward conduction therethrough, impedance means for effecting oppositely poled series connections between a source of variable potential and said diodes for superimposing on said direct current a variable current within the forward conduction range, means including a transformer for coupling a source of alternating potential with said diodes to pass an alternating current therethrough dependent upon the response of said diodes to said variable current, and means selectively responsive to the difference in alternating current passing through a pair of said diodes at the frequency of said alternating potential for deriving a signal which is proportional to the product of said alternating potential and said variable potential.

References Cited in the file of this patent
UNITED STATES PATENTS 2,560,170    Gray               July 10, 1951
2,840,726    Hamilton         June 24, 1958
2,873,387    Kidd               Feb. 10, 1959

OTHER REFERENCES

Gray: "Applied Electronics," 2nd edition, 1954, John Wiley & Sons, New York.

"The Application of Some Semiconductors as Logarithmic Elements," in "Proceeding of the I.R.E., July 1954, pages 1113–1116.